United States Patent
Noh et al.

(10) Patent No.: US 11,885,044 B2
(45) Date of Patent: Jan. 30, 2024

(54) METHOD FOR PRODUCING POLYPROPYLENE NONWOVEN FABRIC

(71) Applicant: LG Chem, Ltd., Seoul (KR)

(72) Inventors: Kyung Seop Noh, Daejeon (KR); Seong Min Chae, Daejeon (KR); Churl Young Park, Daejeon (KR); Sangjin Jeon, Daejeon (KR); Taejin Kim, Daejeon (KR)

(73) Assignee: LG Chem, Ltd.

( * ) Notice: Subject to any disclaimer, the term of this patent is extended or adjusted under 35 U.S.C. 154(b) by 959 days.

(21) Appl. No.: 16/643,651

(22) PCT Filed: Dec. 17, 2018

(86) PCT No.: PCT/KR2018/016030
§ 371 (c)(1),
(2) Date: Mar. 2, 2020

(87) PCT Pub. No.: WO2019/124911
PCT Pub. Date: Jun. 27, 2019

(65) Prior Publication Data
US 2020/0240058 A1  Jul. 30, 2020

(30) Foreign Application Priority Data

Dec. 21, 2017 (KR) .................. 10-2017-0177535
Dec. 13, 2018 (KR) .................. 10-2018-0161300

(51) Int. Cl.
*D01F 6/06* (2006.01)
*D04H 1/4291* (2012.01)
*C08F 110/06* (2006.01)
*D04H 1/44* (2006.01)
*D01D 1/02* (2006.01)
*D01D 5/088* (2006.01)
*C08F 4/02* (2006.01)

(52) U.S. Cl.
CPC .................. *D01F 6/06* (2013.01); *C08F 4/02* (2013.01); *C08F 110/06* (2013.01); *D01D 1/02* (2013.01); *D01D 5/088* (2013.01); *D04H 1/4291* (2013.01); *D04H 1/44* (2013.01); *C08F 2420/01* (2013.01); *D10B 2321/022* (2013.01)

(58) Field of Classification Search
None
See application file for complete search history.

(56) References Cited

U.S. PATENT DOCUMENTS

| | | | |
|---|---|---|---|
| 5,795,838 A * | 8/1998 | Tsutsui | C08F 10/00 502/103 |
| 5,908,594 A | 6/1999 | Gownder et al. | |
| 6,146,758 A | 11/2000 | Gownder et al. | |
| 7,022,632 B2 * | 4/2006 | Hatta | D04H 1/559 442/268 |
| 2004/0038612 A1 | 2/2004 | Forbes et al. | |
| 2007/0264500 A1 | 11/2007 | Fritz | |
| 2009/0017710 A1 | 1/2009 | Bugada et al. | |
| 2009/0022956 A1 | 1/2009 | Hisamoto | |
| 2010/0233927 A1 | 9/2010 | Standaert et al. | |
| 2011/0081818 A1 | 4/2011 | Bieser et al. | |
| 2015/0239204 A1 * | 8/2015 | Takebe | D04H 3/16 156/60 |
| 2015/0322605 A1 | 11/2015 | Chester et al. | |

FOREIGN PATENT DOCUMENTS

| | | |
|---|---|---|
| CN | 1212298 A | 3/1999 |
| CN | 1950550 A | 4/2007 |
| EP | 2896731 A1 | 7/2015 |
| GB | 2420351 A | 5/2006 |
| JP | H09041252 A | 2/1997 |
| JP | 2007145914 A | 6/2007 |
| KR | 960023379 A | 7/1996 |
| KR | 20050056950 A | 6/2005 |
| KR | 20050104577 A | 11/2005 |
| KR | 20080098637 A | 11/2008 |
| KR | 20100002631 A | 1/2010 |
| KR | 20100041868 A | 4/2010 |
| KR | 20100108440 A | 10/2010 |
| KR | 101618460 B1 | 5/2016 |
| WO | 2007091444 A1 | 8/2007 |

OTHER PUBLICATIONS

Kim et al. KR 101618460 B1, machine translation (Year: 2016).*
Kim et al. KR 20100002631 A, machine translation (Year: 2010).*
Whang et al. KR 20050104577 A, machine translation (Year: 2005).*
Takei et al. JP H0941252 A, machine translation (Year: 1997).*
Chinese Search Report for Application No. 20188006374.3, dated Aug. 10, 2021, 3 pages.
Extended European Search Report including Written Opinion for Application No. EP18892774.3, dated Jul. 3, 2020, pp. 1-5.
Boone et al., "Manufacture of Superfine Organic Fibers", Chemistry Division, Naval Research Laboratory, May 25, 1954, 21 pages.
International Search Report from Application No. PCT/KR2018/016030 dated Apr. 2, 2019, 2 pages.

* cited by examiner

*Primary Examiner* — Benjamin A Schiffman
(74) *Attorney, Agent, or Firm* — Lerner David LLP

(57) ABSTRACT

The polypropylene nonwoven fabric produced by the method for producing a polypropylene nonwoven fabric according to the present invention has features that it has excellent stretchability and excellent water pressure resistance.

15 Claims, No Drawings

METHOD FOR PRODUCING POLYPROPYLENE NONWOVEN FABRIC

CROSS-REFERENCE TO RELATED APPLICATIONS

The present application is a national phase entry under 35 U.S.C. § 371 of International Application No. PCT/KR2018/016030 filed Dec. 17, 2018, which claims priority from Korean Patent Application No. 10-2017-0177535 filed Dec. 21, 2017 and Korean Patent Application No. 10-2018-0161300 filed Dec. 13, 2018, all of which are incorporated herein by reference.

TECHNICAL FIELD

The present invention relates to a method for producing a polypropylene nonwoven fabric having excellent stretchability and excellent water pressure resistance.

BACKGROUND ART

Generally, a nonwoven fabric refers to a fabric made by bonding or interlocking fibrous aggregates by mechanical and chemical treatments such as mechanical operation or thermal bonding without passing through spinning, weaving or knitting processes. The nonwoven fabric includes a felt, a resin bonded nonwoven fabric, a needle punched nonwoven fabric, a spun bonded nonwoven fabric, a spunlace nonwoven fabric, an embossed film, a wet nonwoven fabric, and the like. In the narrow sense, it means being used as interlacing nonwoven fabrics or the like by bonding a contact point between randomly stacked webs and fibers by a resin. The nonwoven fabric is called an adhesive cloth and is also called a bonded fabric. These nonwoven fabrics can be produced by various methods, and for example, a needle punching method, a chemical bonding method, a thermal bonding method, a melt blowing method, a spunlace method, a stitch-bonding method, and a spunbond method are known.

On the other hand, a spunbond nonwoven fabric using a polyolefin resin as a raw material is excellent in touch feeling, flexibility, air permeability, heat insulation and the like, and thus is widely used for filters, packaging materials, bedding, clothes, medical supplies, sanitary articles, automobile interior materials, building materials and the like. In particular, polypropylene staple fibers are processed into a thermal bonded nonwoven fabric through a calender bonding method or an air through bonding method because of its inherent low melting point and excellent chemical resistance, and they are mainly used as surface materials for sanitary articles such as diapers and sanitary napkins.

Homopolypropylene resins produced by Ziegler-Natta catalyst used therefor is excellent in strength, stretchability, etc. and thus is widely used for fiber and injection-molded product applications. However, due to the high xylene soluble content and high TVOC, there is a limit to the production of fibers and injection-molded products.

Further, homopolypropylene resin produced by a metallocene catalyst have narrow molecular weight distribution, and thus is capable of producing uniform fibers while having a thin thickness, which has the advantage of producing a low basis weight nonwoven fabric with excellent strength. However, the metallocene homopolypropylene resin has drawbacks in that the stretchability and the water pressure resistance are inferior.

Therefore, the present inventors have found that in order to produce a nonwoven fabric by using a homopolypropylene resin produced by a metallocene catalyst, when the conditions for producing the nonwoven fabric are appropriately controlled together with the physical properties of the homopolypropylene resin, as will be described in detail below, stretchability and water pressure resistance are also improved together with excellent mechanical properties, thereby completing the present invention.

DETAILED DESCRIPTION OF THE INVENTION

Technical Problem

It is an object of the present invention to provide a method for producing a polypropylene nonwoven fabric having improved stretchability and water pressure resistance together with mechanical properties.

It is another object of the present invention to provide a polypropylene nonwoven fabric produced by the above-mentioned method.

Technical Solution

In one aspect of the invention, there is provided a method for producing a polypropylene nonwoven fabric including the steps of: spinning a metallocene polypropylene resin to produce filaments (step 1); cooling the spun filaments at a temperature of 10 to 20° C. (step 2); and bonding the cooled filaments together at 150 to 165° C. to form a nonwoven fabric (step 3), wherein the metallocene polypropylene resin has a weight average molecular weight of 100,000 to 150,000, a molecular weight distribution (PDI) of 2.0 to 2.5, a melt index (MI, measured at 230° C. under a load of 2.16 kg according to ASTM D1238) of 20 to 30 g/10 min, and xylene soluble (XS) content of 2% by weight or less.

Hereinafter, the present invention will be described in detail for each step.

(Step 1)

In one embodiment of the invention, the method for producing a polypropylene nonwoven fabric employs a spunbond method, and the spunbond method can be generally divided into a spinning step of spinning a metallocene polypropylene resin to produce filaments, and a bonding step of bonding the spun filaments to form a nonwoven fabric.

Step 1 corresponds to a spinning step of the spunbond method. In the present invention, filaments are produced by spinning a metallocene polypropylene resin.

The spinning conditions are not particularly limited as long as they are the conditions for producing filaments. Generally, a metallocene polypropylene resin is spun in a molten state toward orifices by air pressure to produce filaments. The orifice may be one or in plurality. In consideration of manufacturing efficiency, it is desirable to use a plurality of orifices simultaneously. Further, the temperature for the melting can be appropriately adjusted at a temperature higher than the melting point of the metallocene polypropylene resin.

In one embodiment of the invention, there is provided a method for producing a polypropylene nonwoven fabric wherein the metallocene polypropylene resin has a weight average molecular weight of 100,000 to 150,000, a molecular weight distribution (PDI) of 2.0 to 2.5, a melt index (MI, measured at 230° C. under a load of 2.16 kg according to ASTM D1238) of 20 to 30 g/10 min, and xylene soluble (Xs) content of 2% by weight or less, as described above. When a metallocene polypropylene resin satisfying the above-mentioned conditions is used, a polypropylene nonwoven fabric having improved mechanical property, stretchability and water pressure resistance can be produced.

Preferably, the weight average molecular weight is 100,000 to 110,000.

Preferably, the PDI is 2.3 to 2.4.

Preferably, the MI is 22 to 29 g/10 min, or 25 to 28 g/10 min.

Preferably, the xylene-soluble (Xs) content is 1.5% by weight or less, or 1.0% by weight or less. The theoretical lower limit of the xylene soluble (Xs) content is 0% by weight, but as an example, it is 0.01% by weight or more, 0.05% by weight or more, or 0.1% by weight or more.

Preferably, the metallocene polypropylene resin has a melting point of 150 to 155° C., more preferably 152 to 153° C.

Preferably, the metallocene polypropylene resin is prepared by using a compound represented by the following Chemical formula 1 as a catalyst:

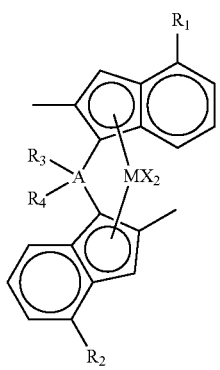

[Chemical Formula 1]

in Chemical formula 1, $R_1$ and $R_2$ are each independently phenyl, or phenyl substituted with $C_{1-20}$ alkyl;

$R_3$ and $R_4$ are each independently $C_{1-20}$ alkyl;

A is carbon, silicon, or germanium;

M is zirconium, or hafnium, and

X is halogen, or $C_{1-20}$ alkyl.

Preferably, $R_1$ and $R_2$ are phenyl substituted with tert-butyl. More preferably, $R_1$ and $R_2$ are 4-tert-butyl-phenyl.

Preferably, $R_3$ and $R_4$ are ethyl.

Further, preferably, A is silicon.

Further, preferably, X is chloro.

Preferably, the compound represented by the chemical formula 1 is as follows:

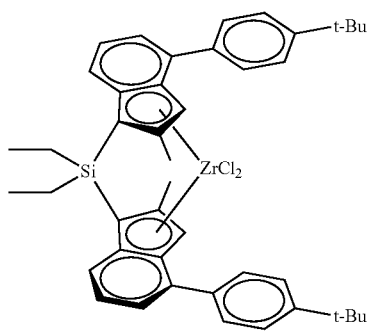

On the other hand, the compound represented by the chemical formula 1 may be supported on a support. As the carrier, those commonly used in the art can be used without particular limitation, and preferably, at least one carrier selected from the group consisting of silica, silica-alumina and silica-magnesia may be used. On the other hand, when the catalyst is supported on a support such as silica, since the silica support and the functional group of the compound represented by the chemical formula 1 are chemically bonded and supported, the catalyst is not substantially isolated from the surface in a polymerization process, and thus fouling of a reactor wall surface or polymer particles sticking together may not be caused when preparing a polyolefin by slurry or gas phase polymerization.

Specifically, the support may be silica dried at a high temperature, silica-alumina, or the like, and they may commonly contain an oxide, a carbonate, a sulfate, a nitrate such as $Na_2O$, $K_2CO_3$, $BaSO_4$, $Mg(NO_3)_2$ and the like.

In addition, the catalyst may further include a cocatalyst consisting of alkylaluminoxane. When such a cocatalyst is used, it can be used as a catalyst in which X bonded to the metal element (M) of the compound represented by the chemical formula 1 is substituted with an alkyl group, for example, $C_{1-20}$ alkyl.

As the cocatalyst, those commonly used in the art may be used without particular limitations, and preferably, at least one cocatalyst selected from the group consisting of silica, silica-alumina, and an organic aluminum compound may be used.

The metallocene polypropylene resin to be used in the present invention can be prepared by polymerizing propylene in the presence of the catalyst.

The polymerization can be carried out by reacting at a temperature of 25 to 500° C. and a pressure of 1 to 100 kgf/cm² for 1 to 24 hours. At this time, the polymerization reaction temperature is preferably 25 to 200° C., more preferably 50 to 100° C. Further, the polymerization reaction pressure is preferably 1 to 70 kgf/cm², more preferably 5 to 40 kgf/cm². The polymerization reaction time is preferably 1 to 5 hours.

In the polymerization process, the molecular weight range can be adjusted depending on hydrogenation conditions such as addition or non-addition of hydrogen. In particular, under a hydrogen-free condition, high-molecular weight metallocene polypropylenes can be prepared. When hydrogen is added, low-molecular weight metallocene polypropylenes can be produced even in the presence of a small amount of hydrogen. At this time, the content of hydrogen added in the polymerization process may range from 0.07 L to 4 L under a reactor pressure of 1 atm, or hydrogen may be supplied at a pressure of 1 bar to 40 bar or at a molar ratio of hydrogen to the monomer of 168 ppm to 8,000 ppm.

(Step 2)

As described above, in one embodiment of the invention, the method for producing a polypropylene nonwoven fabric employs a spunbond method, and includes a step of cooling the spun filaments between the spinning step and the bonding step. In one embodiment of the invention, it has been found that the physical properties of the finally produced nonwoven fabric are changed according to such cooling conditions.

Therefore, the method of the present invention includes a step of cooling the filaments spun in step 1 at a temperature of 10 to 20° C. Even when the same metallocene polypropylene resin is used, the physical properties of the finally produced nonwoven fabric can be adjusted depending on the cooling conditions.

The cooling can be performed by supplying a cooling air in the process of spinning filaments from the orifices and collecting them by a collector. At this time, the cooling condition can be controlled by adjusting the temperature of the cooling air.

Preferably, the temperature of the cooling air is 12° C. or more, 13° C. or more, 14° C. or more, or 15° C. or more, and 20° C. or less, 19° C. or less, or 18° C. or less.

(Step 3)

Step 3 corresponds to a bonding step of the spunbond method, and is a step of bonding the filaments cooled in step 2 together at 150 to 165° C. to form a nonwoven fabric.

The above step is a calendering process, in which adhesion between filaments is performed by applying heat to the filaments, thereby producing a nonwoven fabric in the form of being entangled with one another. Step 3 may be performed by collecting the filaments produced in step 2 on a conveyor belt or support and applying them to a calendering process.

Polypropylene Nonwoven Fabric

As shown in the examples described below, the polypropylene nonwoven fabric produced by the production method of the present invention exhibits superior mechanical property, stretchability and water pressure resistance, compared to those of the nonwoven fabric made of polypropylene produced using Ziegler-Natta catalyst. In particular, the polypropylene nonwoven fabric produced by the production method of the present invention has a water pressure resistance of 150 mmH$_2$O or more, and preferably 160 mmH$_2$O or more. The water pressure resistance is better as the value is higher, and the upper limit is not limited, but for example, it is 300 mmH$_2$O or less, 250 mmH$_2$O or less, or 200 mmH$_2$O or less.

In addition, even in the case of polypropylene prepared using a metallocene catalyst, when the physical properties of polypropylene according to the present invention are not satisfied, the mechanical physical property, stretchability and water pressure resistance are not improved.

Further, even when the same polypropylene was used, it has been found that mechanical properties, stretchability and water pressure resistance are controlled according to the cooling conditions.

Advantageous Effects

The polypropylene nonwoven fabric produced by the method for producing a polypropylene nonwoven fabric according to the present invention has features that it has excellent stretchability and excellent water pressure resistance.

DETAILED DESCRIPTION OF THE EMBODIMENTS

Hereinafter, preferred examples will be presented to facilitate understanding of the present invention. However, these examples are provided for a better understanding of the present invention only, and are not intended to limit the scope of the invention.

Preparation Example: Preparation of Catalyst

Step 1) Preparation of (diethylsilane-diyl)-bis((2-methyl-4-tert-butyl-phenylindenyl)silane 2-Methyl-4-tert-butylphenylindene (20.0 g) was dissolved in toluene/THF=10/1 solution (220 mL), and then n-butyllithium solution (2.5 M, hexane solvent, 22.2 g) was slowly added dropwise thereto at 0° C., and the mixture was stirred at room temperature for 1 day. Then, diethyldichlorosilane (6.2 g) was slowly added dropwise to the mixed solution at −78° C., and the mixture was stirred for about 10 minutes and then stirred at room temperature for 1 day. Then, the organic layer was removed by adding water, and the solvent was distilled under reduced pressure to give (diethylsilane-diyl)-bis((2-methyl-4-tert-butyl-phenylindenyl)silane.

Step 2) Preparation of [(diethylsilane-diyl)-bis((2-methyl-4-tert-phenylindenyl)]zirconium dichloride (Diethylsilane-diyl)-bis((2-methyl-4-tert-butyl-phenylindenyl)silane prepared in step 1 was dissolved in toluene/THF=5/1 solution (120 mL), and then n-butyllithium solution (2.5 M, hexane solvent, 22.2 g) was slowly added dropwise thereto at −78° C., and the mixture was stirred at room temperature for 1 day. To the reaction solution, zirconium chloride (8.9 g) was diluted with toluene (20 mL) and then slowly added dropwise at −78° C., and the resulting mixture was stirred at room temperature for 1 day. The solvent of the reaction solution was removed under reduced pressure, dichloromethane was added and filtered, and the filtrate was removed by distillation under reduced pressure. Recrystallization using toluene and hexane gave a high purity rac-[(diethylsilane-diyl)-bis((2-methyl-4-tert-phenylindenyl)]zirconium dichloride (10.1 g, 34%, rac: meso=20:1).

$^1$H-NMR (400 MHz, CDCl$_3$) δ 7.69-7.01 (m, 14H), 6.99 (s, 2H), 2.24 (s, 6H), 1.51-1.41 (m, 4H), 1.32 (s, 18H), 1.07 (t, J=6.9 Hz, 6H)

Step 3) Preparation of the Supported Catalyst 100 g of silica and 10 wt % of methylaluminoxane (670 g) were added to a 3 L reactor and reacted at 90° C. for 24 hours. After precipitation, the upper layer was eliminated and the rest was washed twice with toluene. The ansa-metallocene compound rac-[(diethylsilane-diyl)-bis((2-methyl-4-tert-phenylindenyl)]zirconium dichloride (5.9 g) prepared in step 2 was diluted in toluene and added to the reactor, and then the solution was reacted at 70° C. for 5 hours. When the precipitation was completed after the reaction, the solution of upper layer was eliminated and the remaining reaction product was washed with toluene and further washed with hexane, and vacuum-dried to give 150 g of a silica-supported metallocene catalyst in the form of solid particles.

Examples 1 to 3

1) Preparation of Polypropylene Resin

A polypropylene resin was prepared using a continuous two-stage loop reactors. More specifically, triethylaluminum (TEAL) and hydrogen gas were respectively introduced thereto by using separate pumps, and the bulk-slurry copolymerization of propylene was carried out. At this time, a mud catalyst that was prepared by mixing 20 wt % of the catalyst with an oil and grease was used. The reactor was operated under the following conditions: the temperature of the reactor was 70° C., and the output per hour was about 40 kg. At this time, the pressure was maintained at 35 kg/cm$^2$, and propylene was introduced at 40 kg/h, TEAL at 50 ppm and hydrogen at 700 ppm.

2) Production of Nonwoven Fabric

Master batch pellets were extruded into microfiber webs to produce a nonwoven fabric, by a process similar to that described in Report No. 4364 of the Naval Research Laboratories, published May 25, 1954 entitled "Manufacture of Superfine Organic Fibers" by Wente, Van. A. Boone, C. D., and Fluharty, E. L.

In detail, a master batch of the above-prepared polypropylene resin and Exolit® OP 950 additive (2.5 wt %) was prepared using a 25 mm twin-screw extruder, and then pelletized. A 31 mm (0.75 in.) Brabender conical twin screw extruder was used to feed the molten masterbatch composition to a melt pump (65 rpm) and then to a 25 cm width meltblowing die having orifices (10 orifices/cm) and orifice diameter of 381 μm. The melt temperature was 235° C., the screw speed was 120 rpm, the die was maintained at 235° C., the primary air temperature and pressure were, respectively, 300° C. and 60 kPa (8.7 psi), the polymer throughput rate was 5.44 Kg/hr, and the collector/die distance was 15.2 cm. While the microfibers spun from the orifices fell to the collector, they were cooled by a cooling air using two pumps, and the microfibers collected by the collector were passed through a calendering process using upper and lower rolls to produce a nonwoven fabric. At this time, the temperatures of the cooling air and the temperatures of the upper and lower rolls in the calendaring process are shown in Table 2 below.

Comparative Examples 1 and 2

Polypropylene (product name: H7700) manufactured by LG Chem Ltd. was used as a comparative example, and a nonwoven fabric was produced in the same manner as in Example above except that the conditions shown in Table 2 below were used.

Experimental Example

(1) Evaluation of Physical Properties of Polypropylene

First, the physical properties of the polypropylene prepared in Examples and Comparative Examples were evaluated as follows.

1) Melt Index (MI): measured at 230° C. under a load of 2.16 kg in accordance with ASTM D1238, and expressed as weight (g) of the polymer obtained by melting for 10 minutes.

2) Xylene soluble: Xylene was added to the sample, heated at 135° C. for 1 hour, and then cooled for 30 minutes, followed by pre-treatment. Xylene was flowed at a flow rate of 1 mL/min for 4 hours with OminiSec (Viscotek Corporation, FIPA) device. When the base line of RI, DP and IP was stabilized, the concentration and the injection amount of the pre-treated samples were filled and measured, thereby calculating the peak area.

3) Melting point (Tm) and recrystallization temperature (Trc): The melting point of polypropylene was measured using Differential Scanning Calorimeter (DSC, device name: DSC 2920, manufacturer: TA Instrument). Specifically, the polymer was heated up to 220° C. and then maintained at that temperature for 5 minutes. After lowering to 20° C., the temperature was again increased. At this time, the increasing speed and the lowering speed of the temperature was adjusted to 10° C./min, respectively.

4) Weight average molecular weight, number average molecular weight, molecular weight distribution: A sample was dissolved in 1,2,4-trichlorobenzene containing 0.0125% using BHT PL-SP260 at 160° C. for 10 hours and subjected to pretreatment. The number average molecular weight and the weight average molecular weight were measured at a temperature of 160° C. using PL-GPC220. The molecular weight distribution was expressed by a ratio between the weight average molecular weight and the number average molecular weight.

5) Tensile strength: measured at a rate of 50 mm/min according to ASTM D790.

6) Flexural strength and flexural modulus: In accordance with ASTM D790, when a sample was laid and fixed to a support and then loaded at a rate of 28 mm/min by a loading nose, the strength (kg/cm$^2$) applied was measured. The flexural strength, which is the maximum value where the load does not increase any more, and the flexural modulus, which is a measure of the stiffness during the initial step of the bending process and is represented by the slope of the initial straight line part of the flexural stress-strain curve, were measured.

7) Izod impact strength: Izod impact strength was measured at normal temperature (23° C.) according to ASTM D256.

8) TVOC (total volatile organic compound emissions): In accordance with the method of VDA 277, the gas generated after heating at 120° C. for 5 hours was evaluated using Headspace Sampler-GC/FID.

The results are shown in Table 1 below.

TABLE 1

| | Unit | Examples 1 to 3 | Comparative Examples 1 and 2 |
|---|---|---|---|
| MI | g/10 min | 26.2 | 33.3 |
| Xylene content | wt % | 0.8 | 1.8 |
| Tm | ° C. | 152.7 | 160.3 |
| Trc | ° C. | 110.9 | 113.0 |
| Number average molecular weight | g/mol | 44,521 | 37,624 |
| Weight average molecular weight | g/mol | 105,860 | 106,862 |
| Molecular weight distribution | — | 2.37 | 2.84 |
| Tensile strength | kg/cm$^2$ | 371 | 338 |
| Flexural strength | kg/cm$^2$ | 513 | 451 |
| Flexural modulus | kg/cm$^2$ | 16444 | 15049 |
| Izod impact strength | kg-cm/cm | 2.2 | 2.2 |
| TVOC | Ppm | 15 | 260 |

(2) Evaluation of Physical Properties of Nonwoven Fabric

The physical properties of the nonwoven fabric prepared in Examples and Comparative Examples were evaluated as follows.

1) Tensile strength and elongation: The film test sample whose thickness was measured was fixed to UTM equipment (ZWICK Roell Inc.) to fill the cross-sectional area. MD and TD directions of the test sample were measured at a speed of 200 mm/min, respectively. The tensile strength (kg/cm$^2$) was confirmed by dividing the elongation (%), the yield load (Kgf) and load at break (kg) of the respective samples into the cross-sectional area (cm$^2$).

2) Water pressure resistance: The pressure was measured at the time when 3 drops were transmitted to the top of the nonwoven fabric while increasing water pressure using a water pressure resistance testing machine.

3) Filament thickness: The thickness of the filament was measured using SEM.

The results are shown in Table 2 below.

TABLE 2

|  |  | Example 1 | Example 2 | Example 3 | Comparative Example 1 | Comparative Example 2[5] |
|---|---|---|---|---|---|---|
| Cooling Air[1] | Temperature (° C.) | 16/16 | 18/17 | 12/12 | 11/12 | 16/16 |
| Calendering temperature[2] (° C.) |  | 160/155 | 160/155 | 160/155 | 165/155 | 165/155 |
| Tensile strength | MD[3] | 114 | 119 | 107 | 101 | 98 |
|  | CD[4] | 49 | 52 | 48 | 44 | 44 |
| Elongation | MD | 69 | 64 | 70 | 56 | 53 |
|  | CD | 65 | 66 | 65 | 65 | 60 |
| Water pressure resistance (mmH$_2$O) |  | 150 | 165 | 138 | 97 | 92 |
| Filament thickness (μm) |  | 16.3 | 14.7 | 18.7 | 20.4 | 18.8 |

[1]Temperature of two cooling airs
[2]Temperature of upper and lower rolls
[3]MD: machine direction
[4]CD: cross machine direction
[5]In Comparative Example 2, partial fiber cutting (breakage) was observed As described above, it was confirmed that in the case of the nonwoven fabric of Examples according to the present invention, the tensile strength was improved as compared with that of the nonwoven fabric of Comparative Examples, and the elongation was similar but the water pressure resistance was remarkably improved. In addition, it was confirmed that the thickness of the filament was smaller than that of Comparative Examples. Further, when comparing Examples 1 and 2, Example 2 showed more excellent tensile strength, water pressure resistance and thinner filament thickness depending on the cooling conditions.

The invention claimed is:

1. A method for producing a polypropylene nonwoven fabric comprising the steps of:
   step 1: spinning a metallocene polypropylene resin to produce filaments;
   step 2: cooling the spun filaments at a temperature of 10 to 20° C.; and
   step 3: bonding the cooled filaments together at 150 to 165° C. to form a nonwoven fabric,
   wherein the metallocene polypropylene resin has:
   a weight average molecular weight of 100,000 to 150,000,
   a molecular weight distribution (PDI) of 2.0 to 2.5,
   a melt index (MI) of 20 to 28 g/10 min measured at 230° C. under a load of 2.16 kg according to ASTM D1238,
   a melting point of 150 to 155° C., and
   a xylene soluble (XS) content of 2% by weight or less.

2. The method for producing a polypropylene nonwoven fabric according to claim 1, wherein the metallocene polypropylene resin has a weight average molecular weight of 100,000 to 110,000.

3. The method for producing a polypropylene nonwoven fabric according to claim 1, wherein the metallocene polypropylene resin has a PDI of 2.3 to 2.4.

4. The method for producing a polypropylene nonwoven fabric according to claim 1, wherein the metallocene polypropylene resin has a MI of 22 to 28 g/10 min.

5. The method for producing a polypropylene nonwoven fabric according to claim 1, wherein the metallocene polypropylene resin has a xylene soluble (XS) content of 1.5% by weight or less.

6. The method for producing a polypropylene nonwoven fabric according to claim 1, wherein the metallocene polypropylene resin is prepared by using a compound represented by the following Chemical formula 1 as a catalyst:

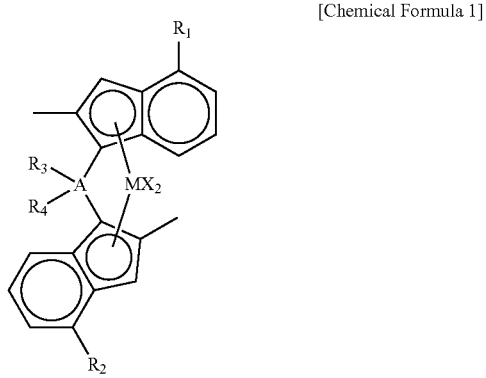

[Chemical Formula 1]

in Chemical formula 1, $R_1$ and $R_2$ are each independently phenyl, or phenyl substituted with $C_{1-20}$ alkyl;

$R_3$ and $R_4$ are each independently $C_{1-20}$ alkyl;

A is carbon, silicon, or germanium;

M is zirconium, or hafnium, and

X is halogen, or $C_{1-20}$ alkyl.

7. The method for producing a polypropylene nonwoven fabric according to claim 6, wherein the compound represented by the chemical formula 1 is the following compound:

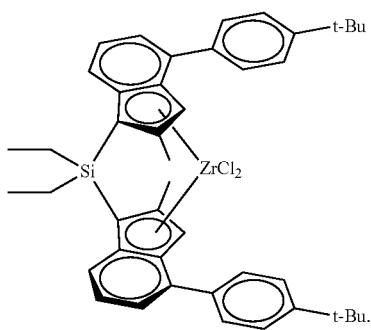

8. The method for producing a polypropylene nonwoven fabric according to claim 7, wherein the compound represented by the chemical formula 1 is supported on a support.

9. The method for producing a polypropylene nonwoven fabric according to claim 8, wherein the support is at least one carrier selected from the group consisting of silica, silica-alumina and silica-magnesia.

10. The method for producing a polypropylene nonwoven fabric according to claim 9, wherein the support contains an oxide, a carbonate, a sulfate, or a nitrate.

11. The method for producing a polypropylene nonwoven fabric according to claim 6, wherein in Chemical formula 1, $R_1$ and $R_2$ are each independently phenyl substituted with tert-butyl, $R_3$ and $R_4$ are ethyl, A is silicon, and X is chloro.

12. The method for producing a polypropylene nonwoven fabric according to claim 6, wherein the catalyst further includes a cocatalyst.

13. The method for producing a polypropylene nonwoven fabric according to claim 12, wherein the cocatalyst is at least one selected from the group consisting of silica, silica-alumina, and an organic aluminum compound.

14. The method for producing a polypropylene nonwoven fabric according to claim 1, wherein step 2 is performed at a temperature of 12 to 20° C.

15. The method for producing a polypropylene nonwoven fabric according to claim 1, wherein the polypropylene nonwoven fabric has a water pressure resistance of 150 mmH$_2$O or more.

* * * * *